United States Patent [19]

Thomas

[11] Patent Number: 5,721,053
[45] Date of Patent: Feb. 24, 1998

[54] POST-FORMABLE NON-STICK ROLLER COATED SMOOTH SUBSTRATES

[75] Inventor: Philippe Andre Fernand Germain Thomas, Helecine, Belgium

[73] Assignee: E. I. du Pont de Nemours and Company, Wilmington, Del.

[21] Appl. No.: 476,997

[22] Filed: Jun. 7, 1995

Related U.S. Application Data

[63] Continuation-in-part of Ser. No. 245,407, May 18, 1994, abandoned, which is a continuation-in-part of Ser. No. 146,811, Nov. 3, 1993, abandoned, which is a continuation-in-part of Ser. No. 995,758, Dec. 23, 1992, abandoned.

[51] Int. Cl.$^6$ ..................................................... B32B 27/30
[52] U.S. Cl. ........................ 428/422; 428/421; 428/473.5
[58] Field of Search .................................. 428/421, 422, 428/473.5; 264/291

[56] References Cited

U.S. PATENT DOCUMENTS

| | | | |
|---|---|---|---|
| 3,661,831 | 5/1972 | Fang | 260/32.8 |
| 4,118,537 | 10/1978 | Vary et al. | 428/422 |
| 4,177,320 | 12/1979 | Yoshimura et al. | 428/419 |
| 4,351,882 | 9/1982 | Concannon | 428/422 |
| 5,168,013 | 12/1992 | Tannenbaum | 428/422 |

FOREIGN PATENT DOCUMENTS

| | | |
|---|---|---|
| 0 692 316 A1 | 1/1996 | European Pat. Off. |
| WO 92/10549 | 6/1992 | WIPO |

OTHER PUBLICATIONS

International Search Report for PCT/US 93/11635 filed Jul. 12, 1993.

*Primary Examiner*—D. S. Nakarani

[57] ABSTRACT

A post-formable coated substrate coated with PTFE and FEP, plus polyamide imide and PPS resins can be made by roller coating and deep drawn with the coating in place.

5 Claims, No Drawings

POST-FORMABLE NON-STICK ROLLER COATED SMOOTH SUBSTRATES

CROSS REFERENCE TO RELATED APPLICATION

This is a continuation-in-part of application Ser. No. 08/245,407 filed May 18, 1994, now abandoned, which is a continuation-in-part of application Ser. No. 08/146,811 filed Nov. 3, 1993, now abandoned, which is a continuation-in-part of Ser. No. 07/995,758 filed Dec. 23, 1992, now abandoned.

BACKGROUND OF THE INVENTION

This invention relates to non-stick coating systems that can be applied by roller coating to smooth substrates. More particularly, it relates to two-layer and at least three-layer coating systems which permit deep drawing of the coated substrates.

Generally in the art a metal substrate is roughened by some means before the first layer of coating is applied so that mechanical bonding will assist chemical adhesive means in holding the coating onto the substrate. Typical roughening means include acid etching, sand-blasting, grit-blasting, and baking a rough layer of glass, ceramic or enamel frit onto the substrate. The problem of adhesion of non-stick coatings to substrates is exacerbated by the nature of the coatings. If the coating is optimized for release to prevent food particles from sticking to it, for easy clean-up after cooking or durability, or to facilitate low friction sliding contact, almost by definition there will be difficulties in making it adhere well to the substrate.

The substrate can be metal, often aluminum of stainless steel used for cookware or industrial applications, or it could be used for an industrial article such as a saw made of carbon steel. Whatever the substrate or the application, if it is necessary to roughen the substrate to make the coating adhere, that at least adds cost and can cause other difficulties including creating a rough profile which can protrude through the coating or cause a roughening of the surface both referred to as telegraphing. This is especially undesirable when smoothness is sought, such as for saws and steam irons. The environmental cost of disposing of etchant materials can be significant.

Efforts in the past to provide non-stick roller coatings for smooth substrates include two PCT patent publications of 25 Jun. 1992, WO92/10309 on "Non-stick Coating System With PTFE and PFA or FEP For Concentration Gradient" and WO92/10549 on "Non-Stick Coating System With PTFE Of Different Melt Viscosities For Concentration Gradient," both in the name of H. P. Tannenbaum. Perfluoropolymers such as polytetrafluoroethylene (PTFE) of two different melt viscosities, or PTFE plus a copolymer of tetrafluoroethylene with hexafluoropropylene (FEP) or with perfluoroalkylvinylether (PFA), are used with a binder of polyamide imide (PAI) or polyether sulfone (PES). U.S. Pat. No. 5,230,961—Tannenbaum (Jul. 27, 1993) teaches the use of PTFE and FEP with PAI and/or PES to give concentration gradients, but without teaching the combination of PAI and polyphenylene sulfone (PPS) needed to give the level of post formability with roller coated needed for some applications.

Post-formable fluororesin-coated articles are taught in U.S. Pat. No. 5,106,682—Matsushita (Apr. 21, 1992), using a roughened aluminum substrate and a two-layer coating of which the first layer is filled and the second layer is not filled. It would be desirable to have a coating system that can be used on smooth aluminum substrates which are to be substantially formed (post-formed) by deep drawing after coating.

Even more challenging is to provide such a coating system that can be applied to smooth substrates by roller coating and still stand up to deep drawing.

Optimum results for roller coating require further developments.

SUMMARY OF THE INVENTION

The present invention provides a post-formable coated substrate wherein the coating comprises a two-layer coating system including a primer applied to the substrate and a topcoat applied to the primer, said primer being the cured product of an aqueous coating composition comprising perfluorocarbon resin and a binder consisting essentially of polyamide imide and polyphenylene sulfide resin, wherein said perfluorocarbon resin comprises two different perfluorocarbon resins, the first being a polymer of polytetrafluoroethylene having a melt viscosity of at least $10^{10}$ Pa Sec and the second being a copolymer of tetrafluoroethylene and hexafluoropropylene having a melt viscosity in the range of $10^2$ to $10^7$ Pa Sec, the weight proportions being in the range of 50 to 85% of the first such resin and 15–50% of the second such resin based on the total of said first and second resins, the ratio of the polyamide imide to polyphenylene sulfide in the range of 3:1 to 1:3, and wherein the weight ratio in the cured coating of fluoropolymer to binder is in the range of 2:1 to 1:1, and said topcoat comprising polytetrafluoroethylene and mica, said topcoat having been cured from a coating composition which also included a polymer which decomposed and left essentially no residue on curing of the coating.

In certain of its embodiments, the invention provides a two-layer coating system on a substrate with the coating of the invention as the primer, or a coating system with three or more layers with such a primer and with an intermediate coating which is the cured product of an aqueous coating composition comprising polyphenylene sulfide and polytetrafluoroethylene in weight ratio in the range of about 0.5 to 2.0:6.

In either type of coating system, the topcoat comprises polytetrafluoroethylene, mica and decomposable polymer, preferably with a weight ratio of fluoropolymer to decomposable polymer in the range of 16:0.5 to 16:1.5.

DETAILED DESCRIPTION OF THE PREFERRED EMBODIMENTS

The present invention permits not only lower cost by avoiding the roughening of the substrate but also smoother coated surfaces which can be advantageous for release of food residues from cookware, and for the gliding effect on steam iron sole plates. Also it can allow application of dispersion PTFE coatings by roller coating techniques on smooth substrates.

Various embodiments of the invention involve using at least two perfluorocarbon resins having different melt viscosities in a primer, relatively high and low melt viscosity resins. For the higher melt viscosity, polytetrafluoroethylene is used. This can be straight homopolymer or modified with other monomers in amounts small enough to give a melt viscosity (MV) still over $10^{10}$ Pa Sec. For the lower of the two melt viscosity resins, copolymers of tetrafluoroethylene with fluorinated ethylenepropylene (FEP) are used having a low MV in the range of $10^3$–$10^8$ poise ($10^2$–$10^7$ Pa Sec).

The adhesion of high melt viscosity fluoropolymer coatings to all types of metal substrates, particularly to smooth metal, can be significantly improved through chemically induced stratification or formation of a concentration gradient in the primer, and that can be obtained with the present invention.

The two fluoropolymer resins used with a polymeric binder including both polyamide-imide and polyphenylene sulfide, impart a synergistic effect in which the fluoropolymer stratifies away from the substrate interface allowing the polymeric binder to obtain a higher concentration and degree of cure at the substrate interface resulting in improved adhesion. The required cure temperature to achieve this stratification can be modified by the choice of fluoropolymer.

Melt viscosity of perfluoropolymers can be determined by known technique such as that in U.S. Pat. No. 4,636,549—Gangal et al (1987). See Col. 4, lines 25–63.

With use of the coatings of the invention on smooth substrates, treated only by washing to remove grease and any other contaminants which might interfere with adhesion, coating systems of the invention give good food release and good resistance to usual durability tests, generally described in U.S. Pat. No. 4,252,859,—Concannon and Vary (1981) col. 2, lines 14–24. The substrate is free of contaminants that would prevent adhesion of the coating.

Typical prior art preparation of surfaces to enhance adhesion of a release coating has involved etching or sand or grit blasting to develop a surface profile. The roughness profile is measured in root mean square (RMS) average microinches from a centerline using a model RT 60 surface roughness tester made by Alpa Co. of Milan, Italy. The profile on typical rolled aluminum after washing to remove grease and contaminants is 16–24 microinches (0.4–0.6 µm). The profile on steel varies more widely but is typically less than 50 microinches (1.3 µm). On both steel and aluminum, before a release coating is applied to profile typically is increased to over 100 micro inches (2.5 µm), preferably for aluminum for some uses to 180–220 micro inches (4.6–5.6 µm). Thus, the present invention is particularly useful with steel or aluminum substrates having a profile of less than 100, preferably less than 50 micro inches (less than 2.5 µm, preferably less than 1.3 µm).

The primers of the invention can also be used on substrates roughened in various ways known in the art to make coating systems even better than without such primers. This can combine improved chemical adhesion with mechanical effects to produce products that may be superior.

In the following examples, the polyamide imide, colloidal silica and dispersions are known in the art and preferably are those of U.S. Pat. Nos. 4,031,286—Seymus (1977) and 4,049,863—Vassiliou.

The following examples provide improved adhesion. The fluoropolymers are provided as 60% dispersions in water. As usual, the solids content of dispersions is indicated in the tables. The compositions were blended by techniques normal in the art and then applied to a smooth, degreased aluminum substrate by roller coating. Percentages, parts and proportions herein are by weight except where indicated otherwise.

An acrysol polyelectrolyte, such as Rohm and Haas RM 5, is used to adjust the viscosity of the coating composition for roller coating application.

The following coating compositions are applied by techniques known in the art, preferably by roller coating on circular discs or even by reverse roller coating. Then separate layers are applied wet-on-wet with minimal drying and no curing between coats, then the coated system is cured such as at about 430° C. for at least one minute. Then the two-layer system can be readily stamped, pressed or drawn into a fry pan with a draw ratio of depth to diameter of up to about 0.2:1. The three-layer system can be readily deep drawn into a casserole with a draw ratio of depth to diameter of at least about 1:1 or for an increase in area by stretching up to 30% of the diameter of the disc.

Numerous experiments have shown the ranges of ratios of perfluoropolymer to binder and of the ingredients in the binder are needed for optimum performance in terms of scratch resistance, cross hatch finger nail adhesion, flexibility around a conical mandrel, and non-stick. The necessary ranges of ratios of perfluorocarbon resin to binder resin is 2:1 to 1:1, and of PAI to PPS is 3:1 to 1:3. PAI gives good scratch resistance, and PPS gives more flexibility, needed for formability in deep drawing roller coated substrate.

EXAMPLES

Example 1: —Two Coat System—PPS/PAI/PTFE/FEP PRIMER—used with PTFE Topcoat of Example 3

| PRIMER | |
|---|---|
| Weight Percent | Ingredient |
| 1.83 | Carbon Black Pigment |
| 0.92 | Aluminum Silicate Extender |
| 2.13 | "LudoxTM" sodium stabilized Colloidal Silica from Du Pont |
| 8.61 | "TE 2442N" PTFE from Du Pont (MV $10^{10}$ Pa Sec) |
| 5.74 | "TB 9075" FEP from Du Pont (MV $2 - 4 \times 10^3$ Pa Sec) |
| 4.79 | Polyphenylene Sulfide Resin Ryton V1 from Philips Petroleum |
| 4.79 | AI 10 Polyamic Acid aqueous solution from Amoco |
| 0.26 | Sodium Polynaphthalenesulfonate Anionic Surfactant |
| 0.26 | Surfynol 440 Nonionic Surfactant from Air Products |
| 61.16 | Deionized Water |
| 0.31 | Triton X-100 Octoylphenolpolyethoxy Non Ionic surfactant from Union Carbide |
| 0.68 | Diethylethanol Amine |
| 1.35 | Triethylamine |
| 3.72 | Furfuryl Alcohol |
| 2.93 | N-Methylpyrolidone |
| 0.52 | Sermul EN74 Nonylphenol Polyethoxy Non Ionic Surfactant from Servo Chemicals |

Example 2 —Three Coat System—

The primer of example 1 is used with the intermediate of this example 2 and the topcoat of example 3 to give a three-layer system.

The resin composition of intermediate PPS, plus PTFE plus Acrysol RM5.

| INTERMEDIATE | |
|---|---|
| Weight Percent | Ingredients |
| 7.53 | Titanium dioxide pigment |
| 2.74 | Carbon black pigment |
| 1.37 | Aluminum Silicate extender |
| 4.44 | Barium-Sulfate extender |
| 28.38 | "TE 3442N" PTFE from Du Pont |
| 4.44 | Polyphenylene Sulfide resin Ryton V1 from Philips Petroleum |
| 0.44 | Sodium Polynaphthalenesulfonate surfactant |

-continued

INTERMEDIATE

| Weight Percent | Ingredients |
| --- | --- |
| 0.35 | Surfynol 440 non-ionic surfactant from Air Products |
| 0.89 | Diethyleneglycol monobutyether |
| 42.32 | Water |
| 2.40 | Triethanolamine |
| 0.89 | Triton X100 Non-ionic surfactant from Union Carbide |
| 2.11 | Acrysol RM5 Acrylic thickening agent from Rohm and Haas |
| 1.70 | SERMUL EP74 Nonylphenylpolyethoxy Non-ionic surfactant from SERVO CHEMICALS |

The resin composition of the topcoat is PTFE plus Acrysol RM5.

TOPCOAT

| Weight Percent | Ingredients |
| --- | --- |
| 4.92 | "Afflair" 153 Titanium dioxide Coated Mica flake from Merck |
| 0.26 | Carbon black pigment |
| 0.13 | Aluminum Silicate extender |
| 40.65 | "TE 3442N" PTFE from Du Pont |
| 0.04 | Sodium Polynaphthalenesulfonate anionic surfactant |
| 0.35 | Bevaloid 680 anti form agent from BEVALOID |
| 0.90 | Diethylphtalate |
| 38.84 | Water |
| 6.99 | Triethenolamine |
| 7.97 | Triton X100 Non-ionic surfactant from Rohm and Haas |
| 2.51 | Acrysol RM5 acrylic thickening agent from Rohm and Haas |
| 2.44 | SERMUL EN74 Nonylphenylpolyethoxy Non-ionic surfactant from SERVO CHEMICALS |

I claim:

1. A post-formable coated substrate wherein the coating comprises a primer applied to the substrate, said primer being the cured product of an aqueous coating composition comprising perfluorocarbon resin and a binder consisting essentially of polyamide imide and polyphenylene sulfide resin, wherein said perfluorocarbon resin comprises two different perfluorocarbon resins, the first being a polymer of polytetrafluoroethylene having a melt viscosity of at least $10^{10}$ Pa Sec and the second being a copolymer of tetrafluoroethylene and hexafluoropropylene having a melt viscosity in the range of $10^2$ to $10^7$ Pa Sec, the weight proportions being in the range of 50 to 85% of the first such resin and 15–50% of the second such resin based on the total of said first and second resins, the ratio of the polyamide imide to polyphenylene sulfide being in the range of 3:1 to 1:3, and wherein the weight ratio in the cured coating of fluoropolymer to binder is in the range of 2:1 to 1:1.

2. The coated substrate of claim 1 which has been deep drawn with a draw ratio of depth to diameter of at least about 1:1.

3. The coated substrate of either claim 1 or claim 2 wherein the substrate is free of contaminants that would prevent adhesion of the coating and has an average surface profile less than 5.6 microns RMS measured from centerline.

4. The coated substrate of claim 1 or claim 2 wherein the substrate before coating has an average surface roughness profile less than 25 microns RMS measured from a centerline.

5. The coated substrate of claim 1 or claim 2 wherein the primer coating resulting from aqueous dispersion is not uniform in composition throughout its thickness but has a lower concentration of polytetrafluoroethylene at the interface with the substrate than at the opposite interface and has a higher concentration of polyamide imide—polyphenylene sulfide mixed binder resins at the interface with the substrate than at the opposite interface.

\* \* \* \* \*